United States Patent
Nakayama et al.

(10) Patent No.: US 10,602,081 B2
(45) Date of Patent: Mar. 24, 2020

(54) ON-VEHICLE SYSTEM AND DISPLAY CONTROL METHOD

(71) Applicant: ALPINE ELECTRONICS, INC., Ota-ku, Tokyo (JP)

(72) Inventors: Takashi Nakayama, Iwaki (JP); Hidetoshi Kadoya, Iwaki (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 27 days.

(21) Appl. No.: 16/177,964

(22) Filed: Nov. 1, 2018

(65) Prior Publication Data

US 2019/0182435 A1 Jun. 13, 2019

(30) Foreign Application Priority Data

Dec. 8, 2017 (JP) .................. 2017-236379

(51) Int. Cl.
*H04N 5/272* (2006.01)
*H04N 5/262* (2006.01)
(Continued)

(52) U.S. Cl.
CPC ............. *H04N 5/272* (2013.01); *B60K 35/00* (2013.01); *G01C 21/365* (2013.01);
(Continued)

(58) Field of Classification Search
CPC .. H04N 5/272; H04N 5/2628; G02B 27/0101; G02B 2027/014; G02B 2027/0138; G02B 2027/0141; G01C 21/365; B60K 2370/592; B60K 2370/165; B60K 2370/5899; B60K 2370/168;
(Continued)

(56) References Cited

U.S. PATENT DOCUMENTS

2007/0067103 A1 3/2007 Fukumoto et al.
2017/0363437 A1* 12/2017 Baracco .............. G01C 21/367
2018/0065482 A1* 3/2018 Yagyu .................. G02B 27/01

FOREIGN PATENT DOCUMENTS

DE 102013016240 6/2014
EP 2672223 12/2013
(Continued)

OTHER PUBLICATIONS

Extended European Search Report for 18210445.5 dated Mar. 6, 2019, 6 pgs.

*Primary Examiner* — Allen C Wong
(74) *Attorney, Agent, or Firm* — Brinks Gilson & Lione

(57) ABSTRACT

When a vehicle stops due to a red light, an image of a scene viewed from a virtual point of view, which moves along a virtual point-of-view moving route, in a virtual line-of-sight direction is displayed on a head-up display. Assuming that a next intersection at which to change lane according to a guidance route is the target intersection, a combination of the virtual point of view and virtual line-of-sight direction is gradually changed from a combination in which a scene is viewed from the point of view of the user in the forward direction of the vehicle to a combination for taking a bird's eye view of a geographic range that includes the current position of the vehicle and then to a combination for taking a bird's eye view of a geographic range that includes the target intersection from a point near the target intersection.

17 Claims, 11 Drawing Sheets

(51) Int. Cl.
   *G02B 27/01* (2006.01)
   *B60K 35/00* (2006.01)
   *G01C 21/36* (2006.01)

(52) U.S. Cl.
   CPC ....... *G02B 27/0101* (2013.01); *H04N 5/2628* (2013.01); *B60K 2370/155* (2019.05); *B60K 2370/1529* (2019.05); *B60K 2370/165* (2019.05); *B60K 2370/166* (2019.05); *B60K 2370/168* (2019.05); *B60K 2370/176* (2019.05); *B60K 2370/177* (2019.05); *B60K 2370/1868* (2019.05); *B60K 2370/21* (2019.05); *B60K 2370/334* (2019.05); *B60K 2370/347* (2019.05); *B60K 2370/52* (2019.05); *B60K 2370/589* (2019.05); *B60K 2370/5899* (2019.05); *B60K 2370/592* (2019.05); *G02B 2027/014* (2013.01); *G02B 2027/0138* (2013.01); *G02B 2027/0141* (2013.01)

(58) Field of Classification Search
   CPC ........ B60K 2370/589; B60K 2370/177; B60K 2370/176; B60K 2370/1868; B60K 2370/1529; B60K 2370/166; B60K 2370/21; B60K 2370/52; B60K 2370/155; B60K 2370/334; B60K 2370/347; B60K 35/00
   USPC .......................................................... 348/115
   See application file for complete search history.

(56) References Cited

FOREIGN PATENT DOCUMENTS

| | | |
|---|---|---|
| JP | 2016-118423 | 6/2016 |
| JP | 2017-037634 | 2/2017 |

\* cited by examiner

ON-VEHICLE SYSTEM AND DISPLAY CONTROL METHOD

RELATED APPLICATION

The present application claims priority to Japanese Patent Application Number 2017-236379, filed Dec. 8, 2017, the entirety of which is hereby incorporated by reference.

BACKGROUND

1. Field of the Invention

The present invention relates to an on-vehicle system having a head-up display.

2. Description of the Related Art

The known technologies related to an on-vehicle system having a head-up system include a technology that displays, on the head-up display, a vehicle speed and information about the state of another vehicle traveling ahead (see Japanese Unexamined Patent Application Publication No. 2017-37634, for example) and a technology that displays, on the head-up display, an arrow representing a direction toward which the vehicle changes lane at a next intersection through which the vehicle will pass (see Japanese Unexamined Patent Application Publication No. 2016-118423, for example).

When the vehicle is stopping at a red light, other vehicles are also stopping. Therefore, the vehicle speed and information about the state of another vehicle that are displayed on the head-up display are not so useful to the user. In addition, it is wasteful to continue to display an arrow representing a direction toward which the vehicle changes lane at a next intersection through which the vehicle will pass during a period in which the vehicle is stopping at a red light.

In the above technology that displays, on the head-up display, a vehicle speed and information about the state of another vehicle traveling ahead and the above technology that displays, on the head-up display, an arrow representing a direction toward which the vehicle changes lane, therefore, effective use of the head-up display is not possible while the vehicle is stopping at a red light.

SUMMARY

In an on-vehicle system having a head-up display, the present disclosure addresses the above problem with the object of more effectively using the head-up display during a period in which the vehicle is stopping according to a signal on a traffic light.

To attain the above object, the present disclosure has, in an on-vehicle system mounted in a vehicle, a head-up display that displays a picture as a virtual image at a position ahead of the front window of the vehicle and a control unit that displays a route guide image on the head-up display during a period in which the vehicle is stopping in response to a stop command signal from a traffic light. The control unit has an image creating and displaying unit that creates an image of a scene viewed from a virtual point of view in a virtual line-of-sight direction and displays the created image on the head-up display as the route guide image. The control unit also has a to-be-viewed target changing unit that gradually changes a combination of the virtual point of view and the virtual line-of-sight direction for an image to be created by the image creating and displaying unit by using a point at which the vehicle is predicted to arrive as a guide point, from a first combination in which the same position as the point of view of the user of the vehicle is used as the virtual point of view and the forward direction of the vehicle is used as the virtual line-of-sight direction to a second combination for taking a bird's eye view of a geographic range that includes at least part of a geographic range between the current position of the vehicle and the guide point and then from the second combination to a third combination for taking a bird's eye view of a geographic range that includes the guide point. The position of the virtual point of view in the second combination is closer to the current position than the position of the virtual point of view in the third combination. The position of the virtual point of view in the third combination is closer to the guide point than the position of the virtual point of view in the second combination.

In this on-vehicle system, the second combination may be a combination of the virtual point of view and the virtual line-of-sight direction for taking a bird's eye view of a geographic range that includes the current position of the vehicle or a combination of the virtual point of view and the virtual line-of-sight direction for taking a bird's eye view of a geographic range that includes both the current position of the vehicle and the guide point.

The on-vehicle system described above may be structured so that the on-vehicle system has a camera that takes a picture of a scene ahead of the vehicle and that the image creating and displaying unit creates at least an image of a scene viewed from the virtual point of view in the first combination in the virtual line-of-sight direction in the first combination from an image captured by the camera.

The on-vehicle system described above may be structured so that the image creating and displaying unit creates an image of a scene viewed from a virtual point of view in a virtual line-of-sight direction that is in a period during which the combination of the virtual point of view and the virtual line-of-sight direction changes from the second combination to the third combination, from a to-be-viewed target bird's eye view photo, which is a photo obtained by photographing a geographic range from a high place, the geographic range being viewed from the virtual point of view in the virtual line-of-sight direction.

In this case, a mobile communication device that performs mobile communication may be included in the on-vehicle system. The image creating and displaying unit may access a server that provides photos obtained by photographing various geographic regions from high places through mobile communication performed by the mobile communication device and may obtain, from the server, the to-be-viewed target bird's eye view photo.

The on-vehicle system described above may be structured so that: if the current position of the vehicle is included in the geographic range of an image of a scene viewed from a virtual point of view in a virtual line-of-sight direction that is in a period during which the combination of the virtual point of view and the virtual line-of-sight direction changes from the second combination to the third combination, the image creating and displaying unit combines the image of the scene with a figure representing the current position of the vehicle; and if the guide point is included in the geographic range of the image of the scene, the image creating and displaying unit combines the image of the scene with a figure representing the position of the guide point; after which the image creating and displaying unit displays the combined image on the head-up display as the route guide image.

The on-vehicle system described above may be structured so that the on-vehicle system has a guidance route setting unit that sets a route to a destination as a guidance route, the guide point being a point on the guidance route, and that: if the current position of the vehicle is included in the geographic range of an image of a scene viewed from a virtual point of view in a virtual line-of-sight direction that is in a period during which the combination of the virtual point of view and the virtual line-of-sight direction changes from the second combination to the third combination, the image creating and displaying unit combines the image of the scene with a figure representing the current position of the vehicle; if a road on the guidance route is included in the geographic range of the image of the scene, the image creating and displaying unit combines the image of the scene with a figure representing the guidance route; and if the guide point is included in the geographic range of the image of the scene, the image creating and displaying unit combines the image of the scene with a figure representing the position of the guide point; after which the image creating and displaying unit displays the combined image on the head-up display as the route guide image.

In this case, the guide point may be a destination on the guidance route or a next intersection at which to change lane according to the guidance route.

The on-vehicle system described above may be structured so that when the vehicle stops at a point in time in response to a stop command signal from a traffic light: if a time taken from the point in time until the traffic light indicates a signal that allows traveling is longer than a predetermined period, the control unit displays the route guide image on the head-up display during a period in which the vehicle is stopping in response to the stop command signal from the traffic light; and if the time taken from when the vehicle stops until the traffic light indicates a signal that allows traveling is shorter than the predetermined period, the control unit does not display the route guide image on the head-up display during a period in which the vehicle is stopping in response to the stop command signal from the traffic light.

The on-vehicle system described above may be structured so that the to-be-viewed target changing unit computes at least a change rate at which the combination of the virtual point of view and the virtual line-of-sight direction changes up to the third combination during a period in which the vehicle is stopping in response to a stop command from a traffic light, according to a time taken from when the vehicle stops in response to the stop command signal from the traffic light until the traffic light indicates a signal that allows traveling, after which the to-be-viewed target changing unit changes the combination according to the computed change rate.

According to the on-vehicle system as described above, in an on-vehicle system that has a head-up display, a route guide image is displayed during a period in which the vehicle is stopping in response to a stop command signal such as a red light from a traffic light. The route guide image is an image of a scene viewed from a virtual point of view in a virtual line-of-sight direction. A combination of the virtual point of view and the virtual line-of-sight direction is continuously changed to a combination to view a scene in the forward direction of the vehicle from the point of view of the user of the vehicle, a combination for taking a bird's eye view of a geographic range that includes at least part of a geographic range between the current position of the vehicle and the guide point, and a combination for taking a bird's eye view of a geographic range that includes the guide point, in that order.

During a period in which the vehicle is stopping in response to a stop command signal from a traffic light, therefore, the user can be notified of a situation from the current position to the guide point in advance. Thus, the head-up display can be used effectively while the vehicle is stopping in response to a stop command signal such as a red light from a traffic light.

The route guide image described above is displayed in such a way that the virtual point of view moves in succession, starting from the point of view of the user of the vehicle. Therefore, the user can easily grasp a positional relationship between the position of the user himself and a target that appears in the route guide image displayed at an appropriate point in time and can spontaneously recognize a situation from the current position to the guide point.

As described above, in an on-vehicle system having a head-up display, the present disclosure can more effectively use the head-up display during a period in which the vehicle is stopping according to a signal on a traffic light.

DETAILED DESCRIPTION OF THE PREFERRED EMBODIMENTS

An embodiment of the present invention will be described below.

Figure 1:
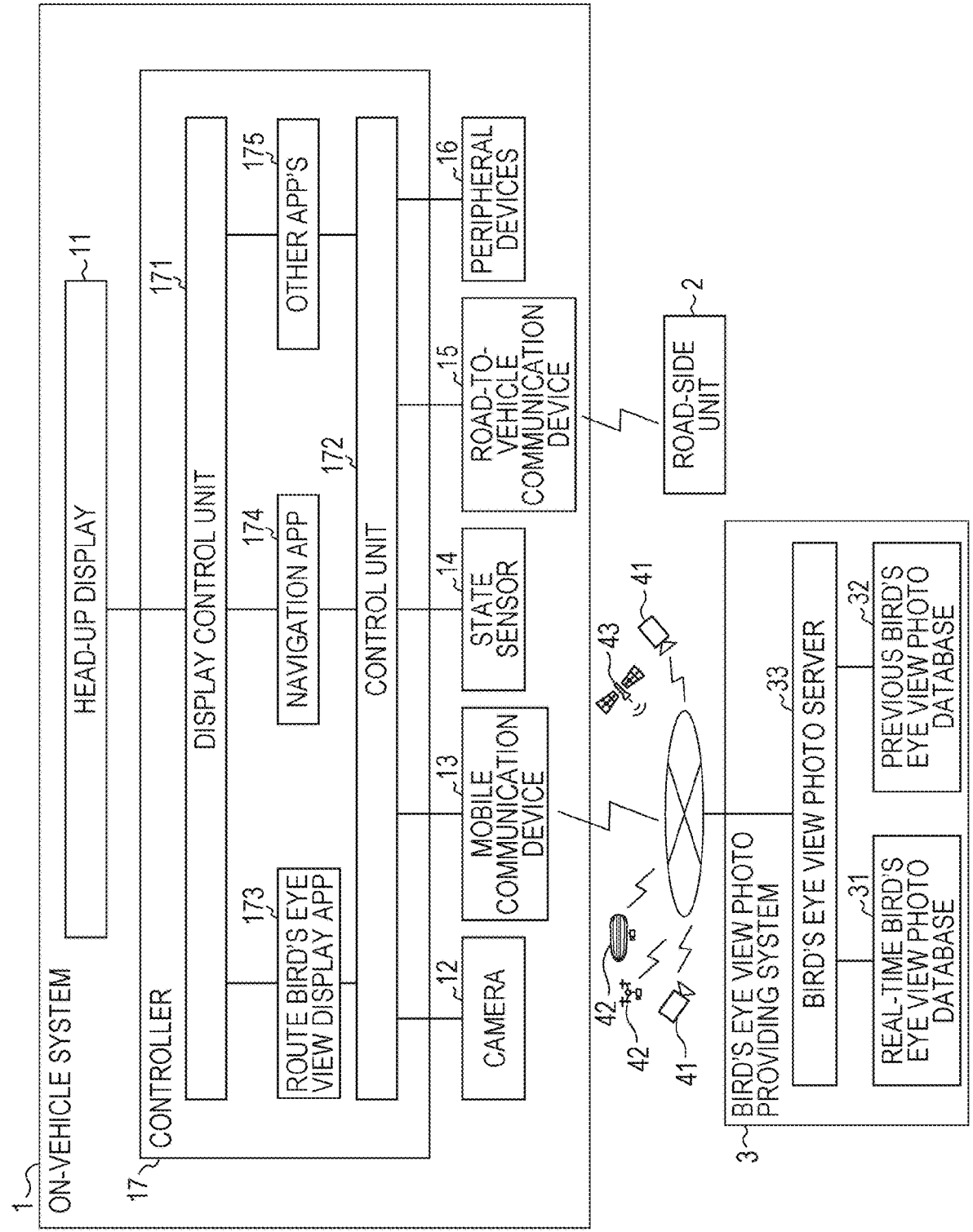
FIG. 1 is a block diagram illustrating the structure of an on-vehicle system according to an embodiment of the present invention.

FIG. 1 illustrates the structure of an on-vehicle system according to this embodiment.

As illustrated in the drawing, the on-vehicle system 1, which is mounted in a vehicle, has a head-up display 11, a camera 12, a mobile communication device 13 that performs mobile communication through a mobile communication network, a state sensor 14 that detects the speed of the vehicle and various states of the vehicle such as parking, stopping and traveling, a road-to-vehicle communication device 15 that communicates with a road-side unit 2 installed at an intersection or the like, various peripheral devices 16 such as a global navigation satellite system (GNSS) receiver, a broadcasting receiver, a storage device, a disk drive and an input device, and a controller 17 that controls these devices.

The controller 17 has a display control unit 171 that controls the display provided by the head-up display 11 and a control unit 172 that controls the entire operation of the controller 17.

The controller 17 also has a route bird's eye view display application 173 (route bird's eye view display APP 173), a navigation application 174 (navigation APP 174) that displays the current position and guides a route, and other applications 175 (other APPs 175), as applications that operate under control of the control unit 172. Each application 175 can cause the display control unit 171 to display an output image produced from the application 175 on the head-up display 11.

Figure 2A:
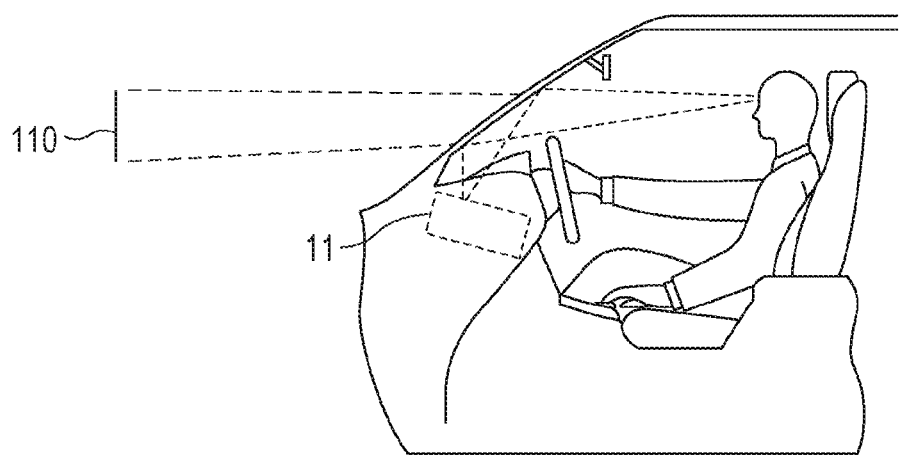
FIGS. 2A and 2B illustrate the placement of a head-up display according to the embodiment of the present invention.
Figure 2B:
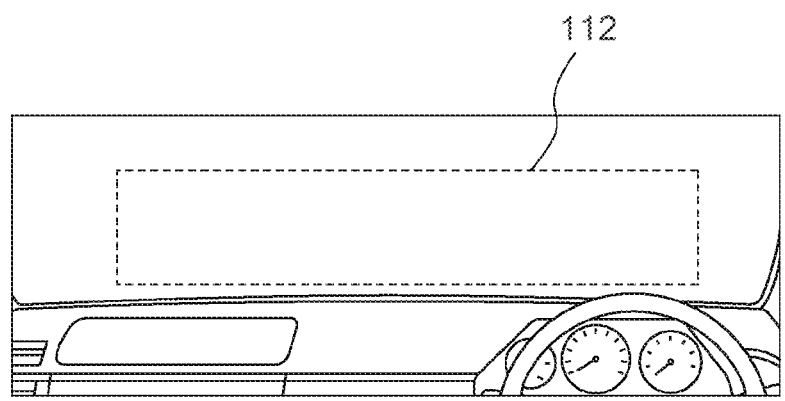

As illustrated in FIG. 2A, by projecting an image on the front window ahead of the driver seat from below, the head-up display 11 displays a virtual image 110 of the image in an area 112, illustrated in FIG. 2B, ahead of the vehicle at an overlapping position when viewed from the user at the driver seat.

Figure 3A:
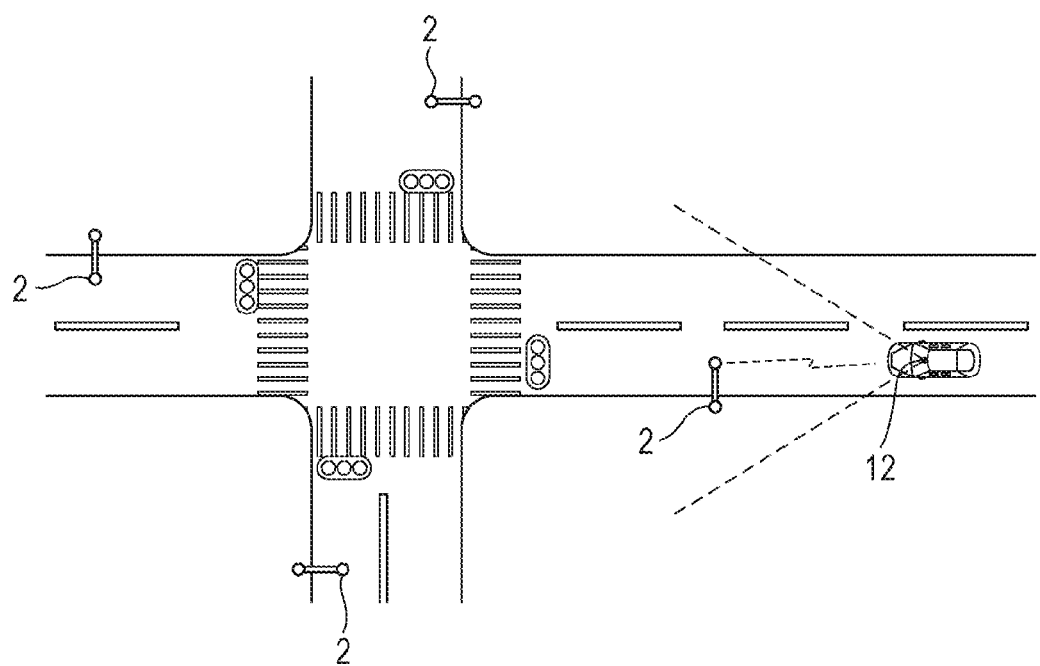
FIGS. 3A and 3B illustrate the placement of a camera and road-to-vehicle communication according to the embodiment of the present invention.
Figure 3B:
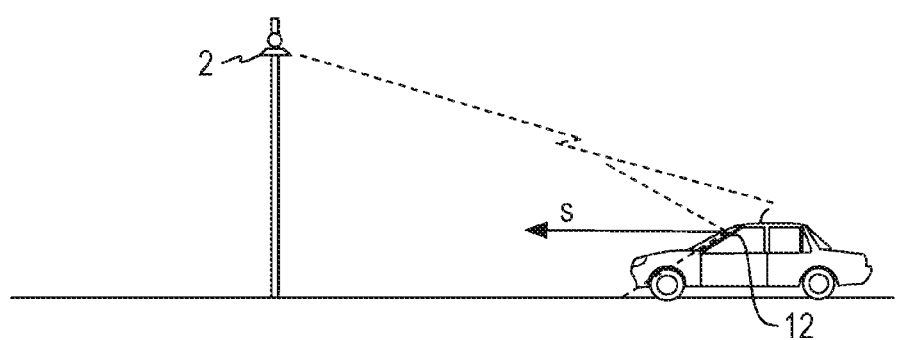

The road-to-vehicle communication device 15 is a receiver that receives information sent from the road-side unit 2 installed at an approach to an intersection or at another position through, for example, narrow-band wireless communication, as illustrated in FIGS. 3A and 3B. Information that the road-to-vehicle communication device 15 receives from the road-side unit 2 includes traffic light information. Traffic light information includes a switching time pattern (time for each color) for red, green, and yellow on the traffic light that gives signals for the road on which the vehicle in which the on-vehicle system 1 is mounted is travelling, and also includes information indicating that the current point in time corresponds to which point in time in the switching time pattern and other information.

The camera 12 is placed at, for example, an upper position on the front window, as illustrated in FIGS. 3A and 3B. The camera 12 takes a picture of a scene ahead of the vehicle. The letter s in FIG. 3B represents the direction of the center of photography (the direction of the line of sight of the camera 12).

Referring again to FIG. 1, the controller 17 can access a bird's eye view photo providing system 3 externally placed on a wide area network (WAN) such as the Internet through the mobile communication device 13. The control unit 172 in the controller 17 sends an image captured by the camera 12 to the bird's eye view photo providing system 3 through the mobile communication device 13.

The bird's eye view photo providing system 3 has a real-time bird's eye view photo database (DB) 31, a previous bird's eye view photo database (DB) 32, and a bird's eye view photo server 33.

The real-time bird's eye view photo DB 31 stores real-time bird's eye view photos, each of which represents the current situation of an area looked down from a high place. These real-time bird's eye view photos are created from images that have been captured by the cameras 12 in individual on-vehicle systems 1 and have been sent to the bird's eye view photo providing system 3 and from images that have been captured by a fixed camera 41 placed at a high place, a camera mounted on a drone 42 in flight, or a camera mounted on a satellite 43 and have been sent to the bird's eye view photo providing system 3.

The previous bird's eye view photo DB 32 stores previous bird's eye view photos, each of which represents a previous situation of an area looked down from a high place in the past. These previous bird's eye view photos are created from satellite photos or aerial photos that were taken in the past for the relevant areas.

When the bird's eye view photo server 33 receives, from the controller 17 in an on-vehicle system 1, a request to submit a bird's eye view photo with a geographic region specified, if a real-time bird's eye view photo in the geographic region is stored in the real-time bird's eye view photo DB 31, the bird's eye view photo server 33 sends the real-time bird's eye view photo, in the geographic region, stored in the real-time bird's eye view photo DB 31 to the controller 17 from which the submission request has been issued as a bird's eye view photo in the geographic region. If a real-time bird's eye view photo in the geographic region is not stored in the real-time bird's eye view photo DB 31, the bird's eye view photo server 33 sends a previous bird's eye view photo, in the geographic region, stored in the previous bird's eye view photo DB 32 to the controller 17 from which the submission request has been issued as a bird's eye view photo in the geographic region.

Figure 4A:
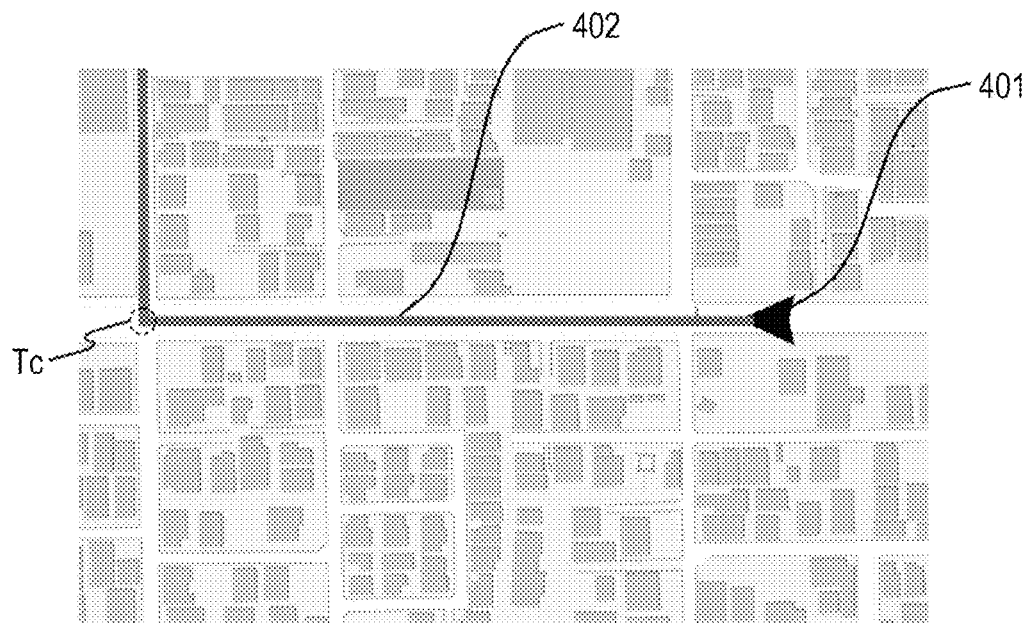
FIGS. 4A and 4B illustrate examples of displays provided by the head-up display according to the embodiment of the present invention while the vehicle is traveling.

Next, the navigation application 174 calculates the current position by using the GNSS receiver and a map stored in the storage unit provided as a peripheral unit. The navigation application 174 also performs processing to calculate a route from a current position 401 to a destination specified by the user and sets the route as a guidance route 402, as illustrated in FIG. 4A.

When the state sensor 14 detects a state in which the vehicle is not parked but is traveling, the controller 17 causes the navigation application 174 to execute route guide processing.

Figure 4B:
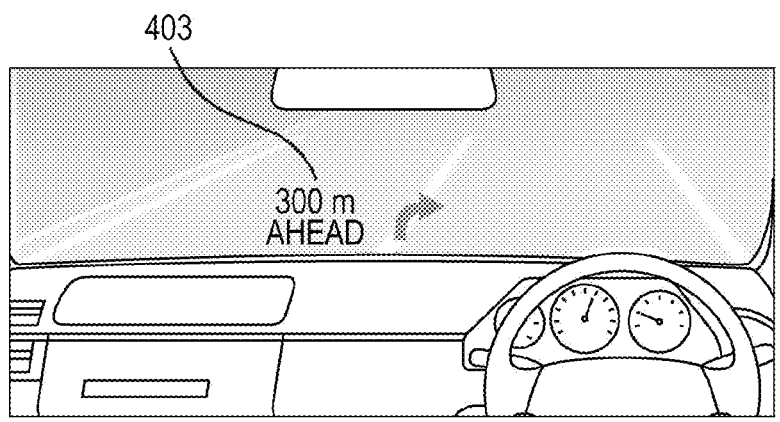

In route guide processing, the navigation application 174 displays route guide information 403 for the user by using the head-up display 11 according to the setting of the guidance route 402, as illustrated in FIG. 4B; the route guide information 403 is composed of a distance to an intersection at which to change lane by, for example, turning to the right or left and an arrow indicating the new direction in which to travel at that intersection.

An operation to effectively use the head-up display 11 in the on-vehicle system 1 while the vehicle is stopping at a red light will be described below.

Figure 5:
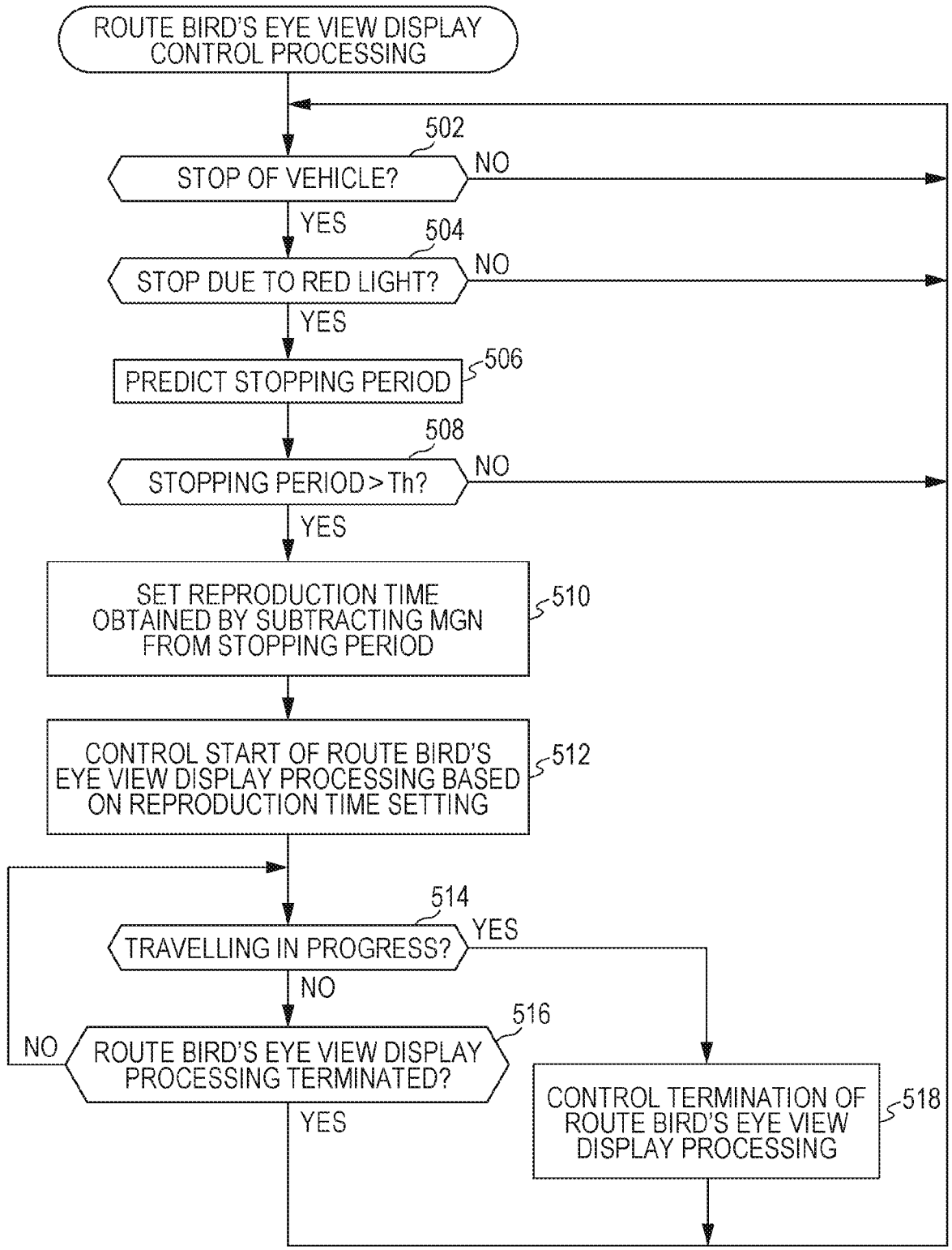
FIG. 5 is a flowchart illustrating route bird's eye view display control processing according to the embodiment of the present invention.

First, route bird's eye view display control processing performed by the control unit 172 in the controller 17 will be described. FIG. 5 illustrates a procedure in this route bird's eye view display control processing.

As illustrated in the drawing, in route bird's eye view display control processing, the control unit 172 monitors whether the state sensor 14 has detected a stop of the vehicle (step 502). If the state sensor 14 has detected a stop of the vehicle, the control unit 172 decides whether the stop of the vehicle is due to a red light of a traffic light, from a positional relationship between the intersection and the current position 401 calculated by the navigation application 174, whether or not the road-to-vehicle communication device 15 has received traffic light information from the road-side unit 2, and the contents of the received traffic light information (step 504).

If the stop of the vehicle is not due to a red light of a traffic light (the result in step 504 is No), the control unit 172 returns to the processing starting from step 502. If the stop of the vehicle is due to a red light of a traffic light (the result in step 504 is Yes), the control unit 172 calculates, from the traffic light information received from the road-side unit 2, a time from the current time until the traffic light changes to a green light as a stopping period (step 506).

The control unit 172 then checks whether the stopping period is longer than a threshold Th, which is, for example, 7 seconds (step 508). If the stopping period is not longer than the threshold Th (the result in step 508 is No), the control unit 172 returns to the processing starting from step 502.

If the stopping period is longer than the threshold Th (the result in step 508 is Yes), the control unit 172 sets, as a reproduction time, a time obtained by subtracting a predetermined margin MGN (2 seconds, for example) from the stopping period (step 510), after which the control unit 172 causes the route bird's eye view display application 173 to start route bird's eye view display processing based on the reproduction time, which has been set as described above (step 512).

The control unit 172 monitors whether the state sensor 14 has detected that the vehicle is travelling (step 514) and whether the route bird's eye view display application 173 has terminated the route bird's eye view display processing (step 516). If the state sensor 14 has detected that the vehicle is travelling (the result in step 514 is Yes), the control unit 172 causes the route bird's eye view display application 173 to terminate the route bird's eye view display processing (step 518), after which the control unit 172 returns to the processing starting from step 502.

If the route bird's eye view display application 173 has terminated route bird's eye view display processing (the result in step 516 is Yes), the control unit 172 returns to the processing starting from step 502 immediately.

This completes the description of route bird's eye view display control processing performed by the control unit 172 in the controller 17.

Next, route bird's eye view display processing performed by the route bird's eye view display application 173 will be described. In route bird's eye view display processing performed by the route bird's eye view display application 173, the start of processing is controlled in step 512 in the above route bird's eye view display control processing, as described above.

Figure 6:
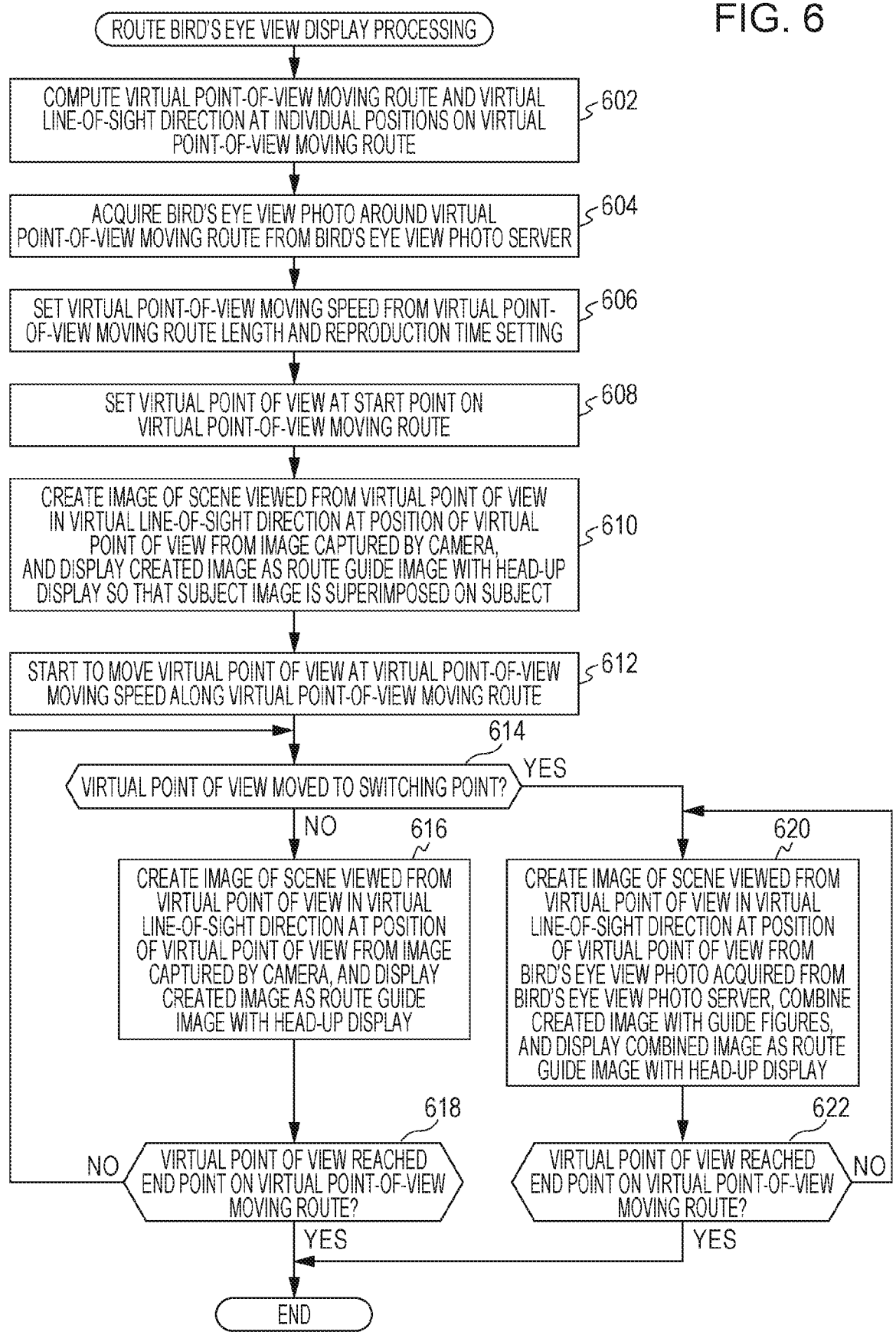
FIG. 6 is a flowchart illustrating route bird's eye view display processing according to the embodiment of the present invention.

FIG. 6 illustrates a procedure in route bird's eye view display processing. As illustrated in the drawing, the route bird's eye view display application 173 first computes a virtual point-of-view moving route and a virtual line-of-sight direction at individual positions on the virtual point-of-view moving route in route bird's eye view display processing (step 602). A virtual point-of-view moving route and a virtual line-of-sight direction at individual points on the virtual point-of-view moving route are computed as described below.

As illustrated in FIG. 4A, the route bird's eye view display application 173 sets a next intersection at which to change lane by, for example, turning to the right or left according to the guidance route 402 set by the navigation application 174 as a destination intersection TC.

Figure 7A:
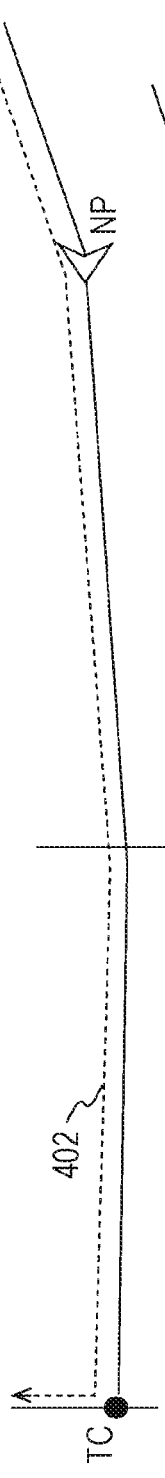
FIGS. 7A, 7B, and 7C illustrate a virtual point-of-view moving route in route bird's eye view display processing according to the embodiment of the present invention.
Figure 7B:
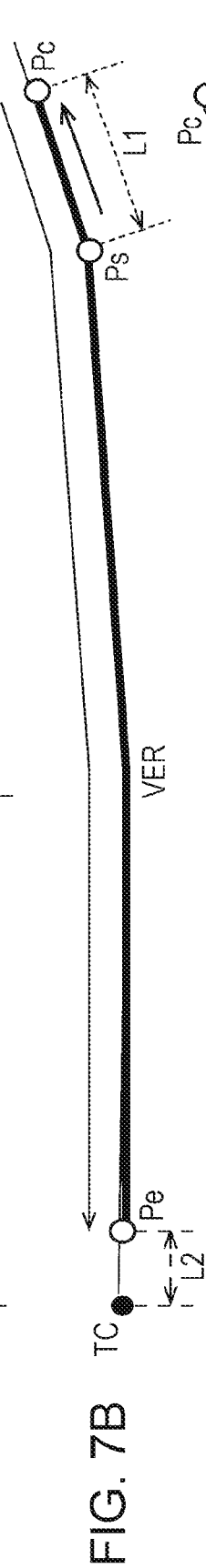
Figure 7C:
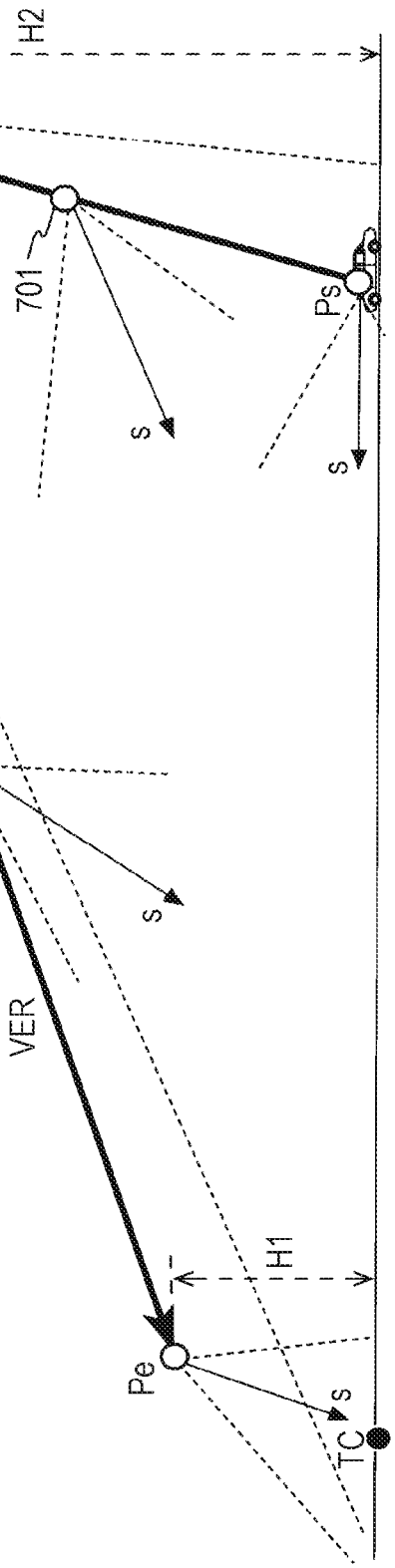

The route bird's eye view display application 173 then sets a virtual point-of-view moving route VER and a virtual line-of-sight direction s at individual positions on the virtual point-of-view moving route VER as illustrated in FIGS. 7B and 7C, for the current position NP computed as illustrated in FIG. 7A and for the guidance route 402 and destination intersection TC set as illustrated in FIG. 7A when viewed in the vertical direction.

FIG. 7B represents the virtual point-of-view moving route VER when viewed in the vertical direction, and FIG. 7C represents the virtual point-of-view moving route VER when viewed in the horizontal direction.

As illustrated in FIG. 7C, the start point Ps of the virtual point-of-view moving route VER is set at the position of the point of view of the user of the vehicle, and virtual line-of-sight direction s at the start point Ps is the forward direction of the vehicle.

The end point Pe of the virtual point-of-view moving route VER is set above a position, on the guidance route 402, short of the destination intersection TC, the distance between the position and the destination intersection TC being L2, the height from the guidance route 402 to the end point Pe being a predetermined value H1. The virtual line-of-sight direction s at the end point Pe is a direction toward the destination intersection TC. A changeover point Pc is set above a position behind the current position NP along the guidance route 402 by a predetermined distance of L1, the height from the guidance route 402 to the changeover point Pc being H2.

The height H2 of the changeover point Pc is set so that, on an image viewed by taking the changeover point Pc as a virtual point of view, the virtual line-of-sight direction s can be set in which the current position NP appears at a position above a predetermined distance from the bottom end of the image at the lower portion of the image and the destination intersection TC appears at a position below a predetermined distance from the top end of the image at the upper portion of the image, according to the distance between the current position NP and the destination intersection TC. A fixed angle of view is predetermined as an angle of view viewed from the virtual point of view.

The virtual line-of-sight direction s at the changeover point Pc is set so that, on the image viewed by taking the changeover point Pc as a virtual point of view, the current position NP appears at a position above a predetermined distance from the bottom end of the image at the lower portion of the image and the destination intersection TC appears at a position below a predetermined distance from the top end of the image at the upper portion of the image.

A route that passes through the start point Ps, changeover point Pc, and end point Pe in that order is set as the virtual point-of-view moving route VER. As illustrated in FIG. 7B, a route between start point Ps and the changeover point Pc and a route between the changeover point Pc and the end point Pe are along the guidance route 402 when viewed in the vertical direction. As illustrated in FIG. 7C, the route between start point Ps and the changeover point Pc and the route between the changeover point Pc and the end point Pe are linear when viewed in the horizontal direction.

The virtual line-of-sight direction s at an individual position (position 701, for example) on the virtual point-of-view moving route VER between the start point Ps and the changeover point Pc is set so that the virtual line-of-sight direction s is gradually changed from the virtual line-of-sight direction s at the start point Ps to the virtual line-of-sight direction s at the changeover point Pc as the vehicle travels from the start point Ps toward the changeover point Pc.

The virtual line-of-sight direction s at an individual position (position 702, for example) on the virtual point-of-view moving route VER between the changeover point Pc and the end point Pe is set so that the virtual line-of-sight direction s is gradually changed from the virtual line-of-sight direction s at the changeover point Pc to the virtual line-of-sight direction s at the end point Pe as the vehicle travels from the changeover point Pc toward the end point Pe.

Referring again to FIG. 6, after a virtual point-of-view moving route and a virtual line-of-sight direction at individual points on the virtual point-of-view moving route have been computed as described above, to obtain a bird's eye view photo in a geographic region around the virtual point-of-view moving route, the route bird's eye view display application 173 issues a request to provide a bird's eye view photo in a geographic region around the virtual point-of-view moving route to the bird's eye view photo server 33 in the bird's eye view photo providing system 3 through the mobile communication device 13 (step 604).

The geographic region, around the virtual point-of-view moving route, for which the route bird's eye view display application 173 requests the bird's eye view photo server 33 to provide a bird's eye view photo includes a geographic range viewed from a position on the virtual point-of-view moving route when a scene is viewed in the virtual line-of-sight direction at the position.

Next, the route bird's eye view display application 173 computes a moving speed at the virtual point of view by dividing the length of the virtual point-of-view moving route with the reproduction time, which has been set (step 606). The route bird's eye view display application 173 then sets a virtual point of view at the start point Ps on the virtual point-of-view moving route (step 608).

The route bird's eye view display application 173 creates an image of a scene viewed from the virtual point of view in the virtual line-of-sight direction at the position of the virtual point of view by applying image conversion processing such as point-of-view conversion to an image captured by the camera 12, after which the route bird's eye view display application 173 displays the created image as a route guide image on the head-up display 11 so that the created image is recognized in such a way that a subject image in the created image is superimposed on the subject in the actual space (step 610).

The route bird's eye view display application 173 then starts to move the virtual point of view on the virtual point-of-view moving route at the moving speed, computed in step 606, of the virtual point of view, from the start point Ps on the virtual point-of-view moving route to the end point Pe on the virtual point-of-view moving route (step 612).

Next, the route bird's eye view display application 173 checks whether the virtual point of view has moved to a switching point (step 614). The switching point is at a position on the virtual point-of-view moving route at which, if the virtual point of view moves to a point closer to the end point Pe on the virtual point-of-view moving route than the switching point is, a superior image of a scene viewed from the virtual point of view in the virtual line-of-sight direction at the position of the virtual point of view cannot be created from an image captured by the camera 12.

Figure 8:
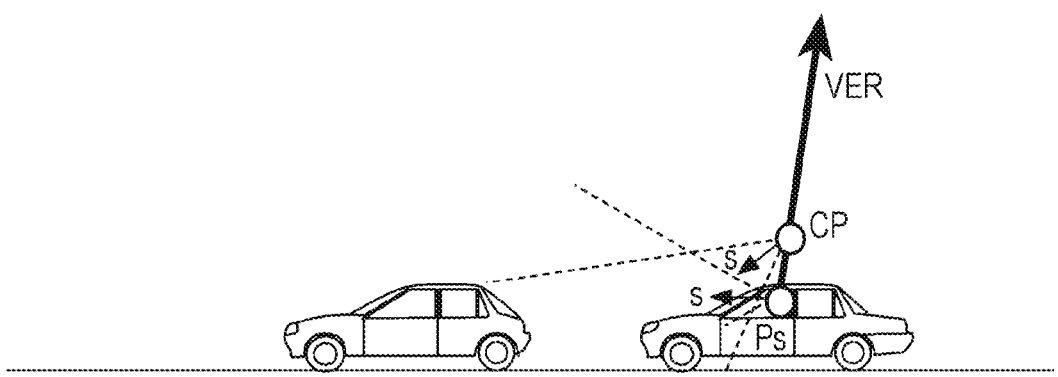
FIG. 8 illustrates a switching point on the virtual point-of-view moving route in route bird's eye view display processing according to the embodiment of the present invention.

That is, if, for example, a switching point CP is taken as the virtual point of view as illustrated in FIG. 8, the switching point CP is the farthest position to which the virtual point of view advances from the start point Ps on the virtual point-of-view moving route in a direction toward the end point Pe on the virtual point-of-view moving route, the farthest position being within a range in which a portion, not included in an image captured by the camera 12, ahead of the vehicle does not appear in a scene viewed from the virtual point of view in the virtual line-of-sight direction at the position of the virtual point of view.

More specifically, on the assumption that a standard-sized car is present a predetermined distance (1.5 meters, for example) ahead of the vehicle as illustrated in FIG. 8, the route bird's eye view display application 173 computes the farthest position to which the virtual point of view advances from the start point Ps on the virtual point-of-view moving route in a direction toward the end point Pe on the virtual point-of-view moving route, the farthest position being within a range in which a portion, not included in an image captured by the camera 12, ahead of the vehicle does not appear in a scene viewed from the virtual point of view in the virtual line-of-sight direction at the position of the virtual point of view. The route bird's eye view display application 173 then sets the computed position as the switching point CP.

However, the presence or absence of another vehicle ahead of the vehicle and the position and size of the other vehicle ahead of the vehicle may be detected from an image captured by the camera 12 before the route bird's eye view display application 173 computes the farthest position to which the virtual point of view advances from the start point Ps on the virtual point-of-view moving route in a direction toward the end point Pe on the virtual point-of-view moving route, the farthest position being within a range in which a portion, not included in the image captured by the camera 12, ahead of the vehicle does not actually appear in a scene viewed from the virtual point of view in the virtual line-of-sight direction at the position of the virtual point of view. The route bird's eye view display application 173 then may set the computed position as the switching point CP.

Referring again to FIG. 6, if the virtual point of view has not moved to the switching point CP (the result in step 614 is No), the route bird's eye view display application 173 creates an image of a scene viewed from the virtual point of view in the virtual line-of-sight direction at the position of the virtual point of view by applying image conversion processing such as point-of-view conversion to an image captured by the camera 12, after which the route bird's eye view display application 173 displays the created image as a route guide image on the head-up display 11 (step 616).

The route bird's eye view display application 173 then checks whether the virtual point of view has reached the end point Pe on the virtual point-of-view moving route (step 618). If the virtual point of view has not reached the end point Pe (the result in step 618 is No), the route bird's eye view display application 173 returns to the processing starting from step 614. If the virtual point of view has reached the end point Pe (the result in step 618 is Yes), the route bird's eye view display application 173 terminates the route bird's eye view display processing.

If the virtual point of view has moved to the switching point CP (the result in step 614 is Yes), the route bird's eye view display application 173 creates an image of a scene viewed from the virtual point of view in the virtual line-of-sight direction at the position of the virtual point of view by, for example, clipping a required partial image from a bird's eye view image acquired from the bird's eye view photo server 33 in the bird's eye view photo providing system 3 or performing point-of-view conversion, after which the route bird's eye view display application 173 combines the created image with guide figures representing the current position 401, guidance route 402, and destination intersection TC and displays the combined image as a route guide image on the head-up display 11 (step 620).

The route bird's eye view display application 173 then checks whether the virtual point of view has reached the end point Pe on the virtual point-of-view moving route (step 622). If the virtual point of view has not reached the end point Pe (the result in step 622 is No), the route bird's eye view display application 173 returns to the processing starting from step 620. If the virtual point of view has reached the end point Pe (the result in step 622 is Yes), the route bird's eye view display application 173 terminates the route bird's eye view display processing.

This completes the description of route bird's eye view display processing performed by the route bird's eye view display application 173.

Figure 9A:
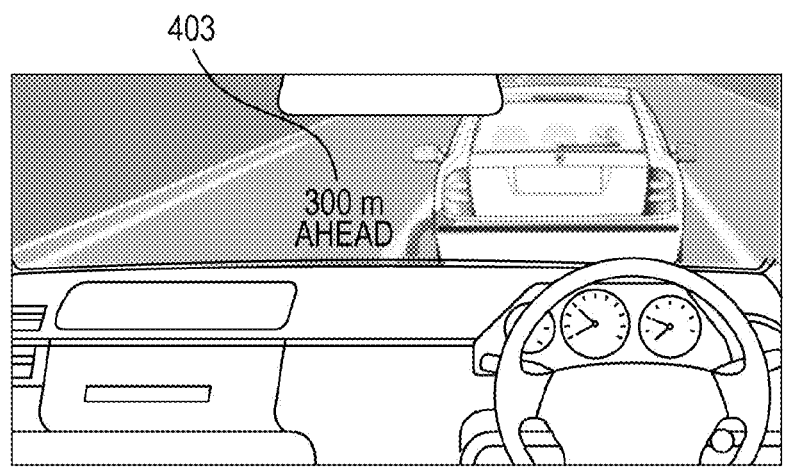
FIGS. 9A, 9B, and 9C illustrate examples of displays provided by the head-up display according to the embodiment of the present invention while the vehicle is stopping at a red light.
Figure 9B:
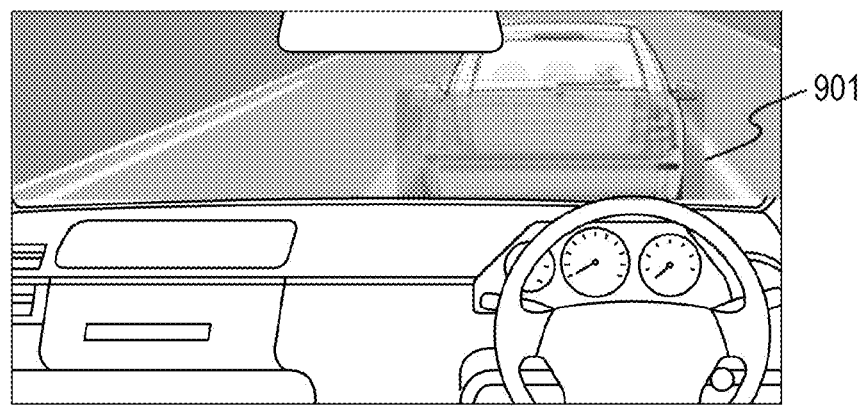

In this route bird's eye view display processing, when the vehicle stops at a red light in a state in which the route guide information 403 is displayed on the head-up display 11 by the navigation application 174 as illustrated in FIG. 9A, if a time taken from that point in time until the traffic light changes to a green light is a predetermined time or longer, the route guide information 403 disappears. Instead, an image 901, captured by the camera 12, of a scene ahead of the vehicle is displayed on the head-up display 11 so that the image 901 overlaps the actual scene at the same position when viewed from the user in the driver seat, as illustrated in FIG. 9B.

Figure 9C:
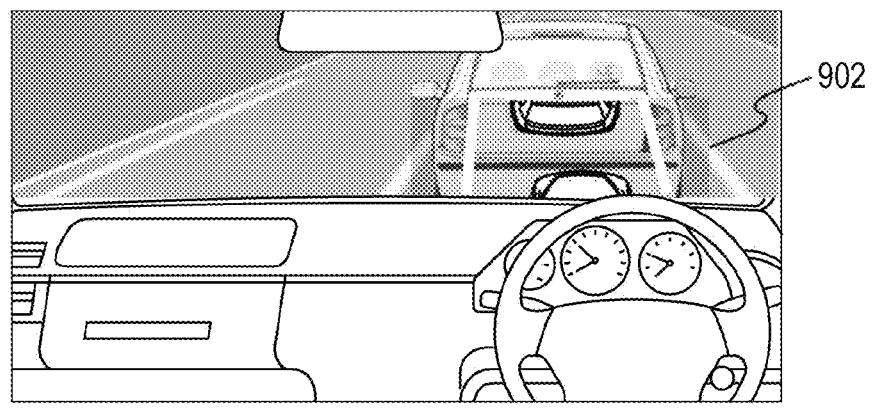

After that, the route guide image displayed on the head-up display 11 is gradually changed to an image 902 of a scene ahead of the vehicle, the image 902 being viewed from a higher point of view as illustrated in FIG. 9C.

Figure 10A:
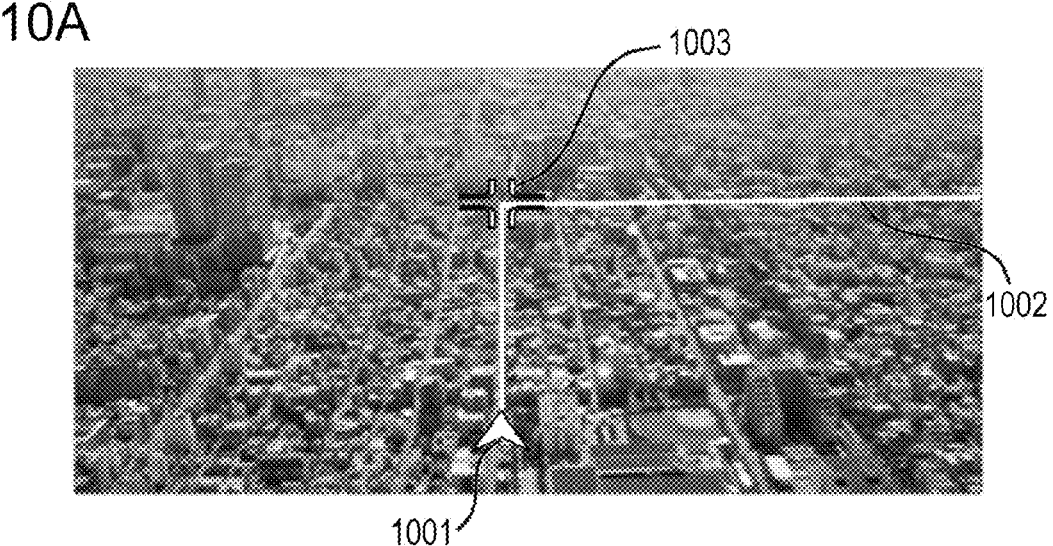
FIGS. 10A, 10B, and 10C also illustrate examples of displays provided by the head-up display according to the embodiment of the present invention while the vehicle is stopping at a red light.

Then, the route guide image displayed on the head-up display 11 represents a scene taken as a bird's eye view of a geographic range including the current position 401 and the destination intersection TC, which is a next intersection at which to change lane, from a high position as illustrated in FIG. 10A. The displayed route guide image also includes a current-position FIG. 1001 that indicates the current position, a guidance route FIG. 1002 that indicates the guidance route, and a mark FIG. 1003 that marks the destination intersection TC.

Figure 10B:
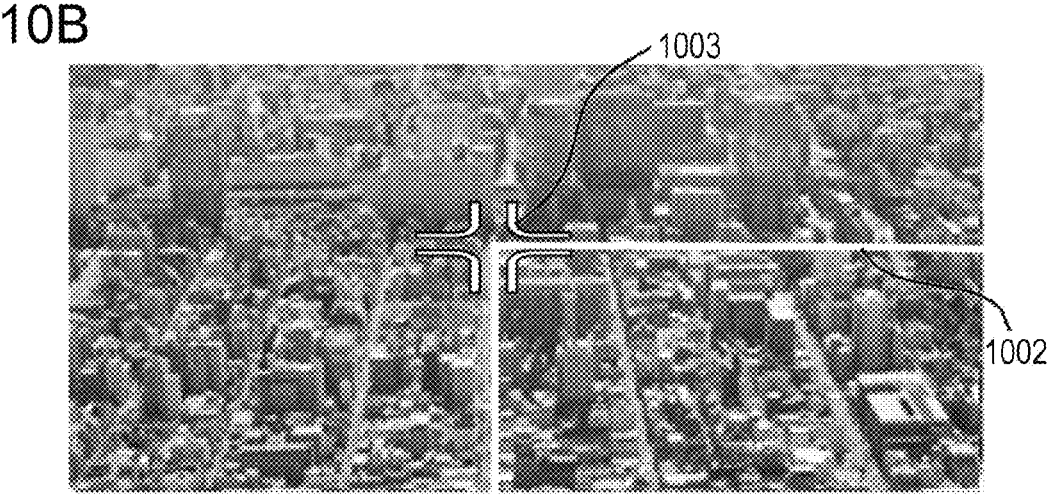

After that, the route guide image displayed on the head-up display 11 represents a scene viewed from a point of view that gradually approaches the destination intersection TC, as illustrated in FIG. 10B.

Figure 10C:
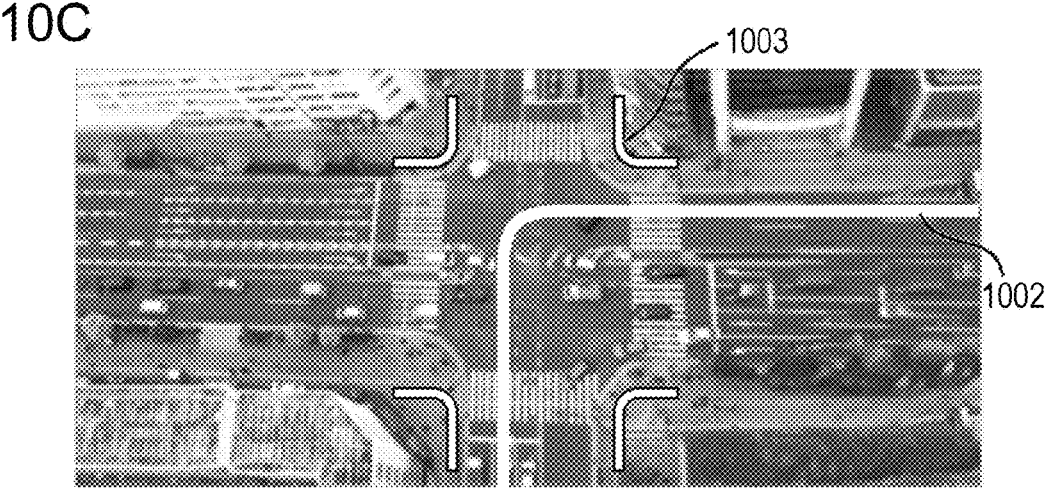

Finally, a scene taken as a bird's eye view of the destination intersection TC from a point close to the destination intersection TC is displayed on the head-up display 11 as the route guide image, as illustrated in FIG. 10C.

This completes the description of the embodiment of the present invention.

According to this embodiment, a scene viewed from a virtual point of view in a virtual line-of-sight direction is displayed on the head-up display 11 during a period in which the vehicle is stopping at a red light of a traffic light. A combination of the virtual point of view and the virtual line-of-sight direction is continuously changed to a combination to view a scene in the forward direction of the vehicle from the point of view of the user of the vehicle, a combination for taking a bird's eye view of a geographic range including the current position of the vehicle and the destination intersection TC, and a combination for taking a bird's eye view of a geographic range including destination intersection TC from a point close to the destination intersection TC, in that order.

During a period in which the vehicle is stopping at a red light of a traffic light, therefore, the user can be notified of the situation from the current position to the destination intersection TC in advance. Thus, the head-up display 11 can be used effectively while the vehicle is stopping at a red light.

Since a scene viewed from a virtual point of view in a virtual line-of-sight direction is displayed on the head-up display 11 in such a way that the virtual point of view moves in succession, starting from the point of view of the user of the vehicle, as described above, the user can easily grasp a positional relationship between the position of the user himself and a target that appears in a scene displayed at an appropriate point in time and can spontaneously recognize the situation from the current position to the destination intersection TC.

The settings of the virtual point-of-view moving route and virtual line-of-sight direction in the embodiment described above may be respectively replaced by the settings of another virtual point-of-view moving route and another virtual line-of-sight direction.

Figure 11:
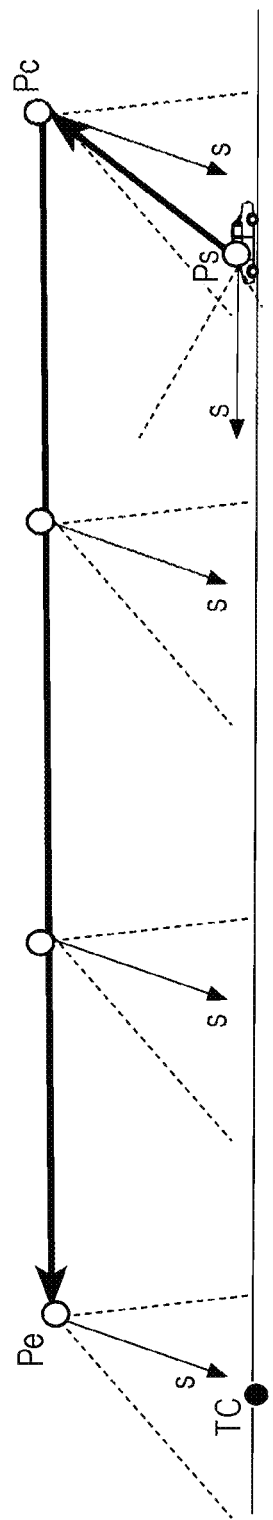
FIG. 11 illustrates another example of the virtual point-of-view moving route in route bird's eye view display processing according to the embodiment of the present invention.

For example, the changeover point Pc may be set to a position at the same height as the end point Pe and the virtual line-of-sight direction s at an individual position between the changeover point Pc and the end point Pe may be the same direction as the virtual line-of-sight direction s at the end point Pe, as illustrated in FIG. 11. In this case, however, a horizontal distance from the current position 401 to the changeover point Pc is a distance from the changeover point Pc to a position at which the current position 401 appears in an image of a scene viewed from the changeover point Pc in the same direction as the virtual line-of-sight direction s at the end point Pe.

Alternatively, for example, by taking the changeover point Pc on the virtual point-of-view moving route VER indicated in FIGS. 7B and 7C and FIG. 11 as the start point Ps on the virtual point-of-view moving route VER, a route from the start point Ps to the end point Pe on the virtual point-of-view moving route VER indicated in FIGS. 7B and 7C and FIG. 11 can also be set as the virtual point-of-view moving route VER.

Although, in the embodiment described above, the end point Pe on the virtual point-of-view moving route has been set for a next intersection, on the guidance route 402, at which to change lane, the end point Pe on the virtual point-of-view moving route may be defined for an arbitrary point. For example, in the above embodiment, when the end point Pe on the virtual point-of-view moving route is to be set, the destination intersection TC may be replaced by a destination point or passing-through point on the guidance route 402, a point on the guidance route 402, the point being a predetermined distance ahead of the current position 401, or a point on the road on which the vehicle is traveling, the point being a predetermined distance ahead of the current position 401.

Although, in the embodiment described above, the movement speed of the virtual point of view has been fixed regardless of the position of the virtual point of view on the virtual point-of-view moving route, the movement speed of the virtual point of view may be varied depending on the position of the virtual point of view on the virtual point-of-view moving route. For example, the movement speed of the virtual point of view may be increased in a range from the start point Ps to the changeover point Pc and may be decreased near the end point Pe.

The embodiment described above can be similarly applied to a case as well in which the vehicle stops in response to a stop command from a traffic light other than a red light.

The route guide image in the embodiment described above may further include road figures, place names, and other map information. The design, such as a color tone, of the route guide image in the embodiment described above may differ between daytime and night time.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An on-vehicle system mounted in a vehicle, the system comprising:
    a head-up display that displays a picture as a virtual image at a position ahead of a front window of the vehicle; and
    a control unit that displays a route guide image on the head-up display during a period in which the vehicle is stopping in response to a stop command signal from a traffic light; wherein
    the control unit has
    an image creating and displaying unit that creates an image of a scene viewed from a virtual point of view in a virtual line-of-sight direction and displays the created image on the head-up display as the route guide image, and
    a to-be-viewed target changing unit that gradually changes a combination of the virtual point of view and the virtual line-of-sight direction for an image to be created by the image creating and displaying unit by using a point at which the vehicle is predicted to arrive as a guide point, from a first combination in which the same position as the point of view of the user of the vehicle is used as the virtual point of view and a forward direction of the vehicle is used as the virtual line-of-sight direction to a second combination for taking a bird's eye view of a geographic range that includes at least part of a geographic range between a current position of the vehicle and the guide point and then from the second combination to a third combination for taking a bird's eye view of a geographic range that includes the guide point, and
    a position of the virtual point of view in the second combination is closer to the current position than a position of the virtual point of view in the third combination, and the position of the virtual point of view in the third combination is closer to the guide point than the position of the virtual point of view in the second combination.

2. The on-vehicle system according to claim 1, wherein the second combination is a combination of the virtual point of view and the virtual line-of-sight direction for taking a bird's eye view of a geographic range that includes the current position of the vehicle or a combination of the virtual point of view and the virtual line-of-sight direction for taking a bird's eye view of a geographic range that includes both the current position of the vehicle and the guide point.

3. The on-vehicle system according to claim 1, further comprising a camera that takes a picture of a scene ahead of the vehicle, wherein the image creating and displaying unit creates at least an image of a scene viewed from the virtual point of view in the first combination in the virtual line-of-sight direction in the first combination from an image captured by the camera.

4. The on-vehicle system according to claim 1, wherein the image creating and displaying unit creates an image of a scene viewed from a virtual point of view in a virtual line-of-sight direction that are in a period during which the combination of the virtual point of view and the virtual line-of-sight direction changes from the second combination to the third combination, from a to-be-viewed target bird's eye view photo, which is a photo obtained by photographing a geographic range from a high place, the geographic range being viewed from the virtual point of view in the virtual line-of-sight direction.

5. The on-vehicle system according to claim 4, further comprising a mobile communication device that performs mobile communication, wherein
    the image creating and displaying unit accesses a server that provides photos obtained by photographing various geographic regions from high places through mobile communication performed by the mobile communication device and obtains, from the server, the to-be-viewed target bird's eye view photo.

6. The on-vehicle system according to claim 1, wherein: if the current position of the vehicle is included in a geographic range of an image of a scene viewed from a virtual point of view in a virtual line-of-sight direction that is in a period during which the combination of the virtual point of view and the virtual line-of-sight direction changes from the second combination to the third combination, the image creating and displaying unit combines the image of the scene with a figure representing the current position of the vehicle; and if the guide point is included in the geographic range of the image of the scene, the image creating and displaying unit combines the image of the scene with a figure representing a position of the guide point, after which the image creating and displaying unit displays the combined image on the head-up display as the route guide image.

7. The on-vehicle system according to claim 1, further comprising a guidance route setting unit that sets a route to a destination as a guidance route, wherein:
    the guide point is a point on the guidance route; and
    if the current position of the vehicle is included in a geographic range of an image of a scene viewed from a virtual point of view in a virtual line-of-sight direction that is in a period during which the combination of the virtual point of view and the virtual line-of-sight direction changes from the second combination to the third combination, the image creating and displaying unit combines the image of the scene with a figure representing the current position of the vehicle; if a road on the guidance route is included in the geographic range of the image of the scene, the image creating and displaying unit combines the image of the scene with a figure representing the guidance route; and if the guide point is included in the geographic range of the image of the scene, the image creating and displaying unit combines the image of the scene with a figure representing a position of the guide point, after which the image creating and displaying unit displays the combined image on the head-up display as the route guide image.

8. The on-vehicle system according to claim 7, wherein the guide point is a destination on the guidance route or a next intersection at which to change a lane according to the guidance route.

9. The on-vehicle system according to claim 1, wherein when the vehicle stops at a point in time in response to a stop command signal from a traffic light, if a time taken from that point in time until the traffic light indicates a signal that allows traveling is longer than a predetermined period, the control unit displays the route guide image on the head-up display during a period in which the vehicle is stopping in response to the stop command signal from the traffic light; and if the time taken from when the vehicle stops until the traffic light indicates a signal that allows traveling is shorter than the predetermined period, the control unit does not display the route guide image on the head-up display during a period in which the vehicle is stopping in response to the stop command signal from the traffic light.

10. The on-vehicle system according to claim 9, wherein, when the route guide image is displayed on the head-up display during a period in which the vehicle is stopping in response to a stop command signal from a traffic light, the to-be-viewed target changing unit computes at least a change rate at which the combination of the virtual point of view and the virtual line-of-sight direction changes up to the third combination during a period in which the vehicle is stopping in response to a stop command from a traffic light, according to a time taken from when the vehicle stops in response to the stop command signal from the traffic light until the traffic light indicates a signal that allows traveling, after which the to-be-viewed target changing unit changes the combination according to the computed change rate.

11. The on-vehicle system according to claim 1, wherein the to-be-viewed target changing unit computes at least a change rate at which the combination of the virtual point of view and the virtual line-of-sight direction changes up to the third combination during a period in which the vehicle is stopping in response to a stop command from a traffic light, according to a time taken from when the vehicle stops in response to the stop command signal from the traffic light until the traffic light indicates a signal that allows traveling, after which the to-be-viewed target changing unit changes the combination according to the computed change rate.

12. A display control method of, in an on-vehicle system mounted in a vehicle, the system having a head-up display that displays a picture as a virtual image at a position ahead of a front window of the vehicle, controlling a display of the head-up display, the method comprising:
   an image creating and displaying step of creating an image of a scene viewed from a virtual point of view in a virtual line-of-sight direction and displaying the created image on the head-up display as a route guide image, during a period in which the vehicle is stopping in response to a stop command signal from a traffic light; and
   a to-be-viewed target changing step of gradually changing a combination of the virtual point of view and the virtual line-of-sight direction for an image to be created in the image creating and displaying step by using a point at which the vehicle is predicted to arrive as a guide point, from a first combination in which the same position as the point of view of the user of the vehicle is used as the virtual point of view and a forward direction of the vehicle is used as the virtual line-of-sight direction to a second combination for taking a bird's eye view of a geographic range that includes at least part of a geographic range between a current position of the vehicle and the guide point and then from the second combination to a third combination for taking a bird's eye view of a geographic range that includes the guide point; wherein
   a position of the virtual point of view in the second combination is closer to the current position than a position of the virtual point of view in the third combination, and the position of the virtual point of view in the third combination is closer to the guide point than the position of the virtual point of view in the second combination.

13. The display control method according to claim 12, wherein the second combination is a combination of the virtual point of view and the virtual line-of-sight direction for taking a bird's eye view of a geographic range that includes the current position of the vehicle or a combination of the virtual point of view and the virtual line-of-sight direction for taking a bird's eye view of a geographic range that includes both the current position of the vehicle and the guide point.

14. The display control method according to claim 12, wherein:
   the on-vehicle system has a camera that takes a picture of a scene ahead of the vehicle; and
   in the image creating and displaying step, at least an image of a scene viewed from the virtual point of view in the first combination in the virtual line-of-sight direction in the first combination is created from an image captured by the camera.

15. The display control method according to claim 12, wherein in the image creating and displaying step, an image of a scene viewed from a virtual point of view in a virtual line-of-sight direction that is in a period during which the combination of the virtual point of view and the virtual line-of-sight direction changes from the second combination to the third combination is created from a to-be-viewed target bird's eye view photo, which is a photo obtained by photographing a geographic range from a high place, the geographic range being viewed from the virtual point of view in the virtual line-of-sight direction.

16. The display control method according to claim 12, further comprising a guidance route setting step of setting a route to a destination as a guidance route, wherein:
   the guide point is a point on the guidance route; and
   in the image creating and displaying step: if the current position of the vehicle is included in a geographic range of an image of a scene viewed from a virtual point of view in a virtual line-of-sight direction that is in a period during which the combination of the virtual point of view and the virtual line-of-sight direction changes from the second combination to the third combination, the image of the scene is combined with a figure representing the current position of the vehicle; if a road on the guidance route is included in the geographic range of the image of the scene, the image of the scene is combined with a figure representing the guidance route; and if the guide point is included in the geographic range of the image of the scene, the image of the scene is combined with a figure representing a position of the guide point, after which the combined image is displayed on the head-up display as the route guide image.

17. The display control method according to claim 16, wherein the guide point is a destination on the guidance route or a next intersection at which to change a lane according to the guidance route.

\* \* \* \* \*